United States Patent
Kodama et al.

(10) Patent No.: US 6,948,247 B2
(45) Date of Patent: Sep. 27, 2005

(54) METHOD FOR FORMING A BEARING RACE FOR A CYLINDRICAL BEARING

(75) Inventors: Osamu Kodama, Komatau (JP); Kaoru Hasegawa, Komatsu (JP); Nobuaki Kawasaki, Komatsu (KR)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/531,679

(22) Filed: Mar. 20, 2000

(65) Prior Publication Data

US 2002/0121021 A1 Sep. 5, 2002

(30) Foreign Application Priority Data

Mar. 18, 1999 (JP) .......................................... 11-074392

(51) Int. Cl.⁷ .............................................. B21D 53/10
(52) U.S. Cl. ............................ 29/898.068; 29/898.13; 29/898.12; 148/218; 148/906
(58) Field of Search ....................... 29/898.068, 898.13, 29/898.12; 148/906, 218; 384/625, 912

(56) References Cited

U.S. PATENT DOCUMENTS

| | | | | |
|---|---|---|---|---|
| 4,871,268 A | * | 10/1989 | Furumura et al. | 384/492 |
| 4,904,094 A | * | 2/1990 | Furumura et al. | 384/492 |
| 4,930,909 A | * | 6/1990 | Murakami et al. | 384/492 |
| 5,011,304 A | * | 4/1991 | Murakami et al. | 384/492 |
| 5,338,377 A | * | 8/1994 | Mitamura et al. | 148/318 |
| 5,413,643 A | * | 5/1995 | Murakami et al. | 148/319 |
| 5,415,705 A | * | 5/1995 | Furumura et al. | 148/319 |
| 5,427,457 A | * | 6/1995 | Furumura et al. | 384/450 |
| 5,447,579 A | * | 9/1995 | Hirakawa et al. | 148/320 |
| 5,658,082 A | * | 8/1997 | Tsushima et al. | 384/492 |
| 5,997,661 A | * | 12/1999 | Matsumoto et al. | 148/316 |
| 6,095,692 A | * | 8/2000 | Takemura | 384/492 |
| 6,158,263 A | * | 12/2000 | Maeda et al. | 72/237 |
| 6,162,390 A | * | 12/2000 | Bellus et al. | 420/100 |
| 6,282,789 B1 | * | 9/2001 | Kino et al. | 29/895.3 |
| 6,423,158 B1 | * | 7/2002 | Maeda et al. | 148/319 |

* cited by examiner

*Primary Examiner*—David P. Bryant
(74) *Attorney, Agent, or Firm*—Darby & Darby

(57) ABSTRACT

A cylindrical roller bearing or needle roller bearing for use with a rolling raceway surface is subjected to a carbonitriding treatment to produce a layer containing 30 to 80% retained austenite in the vicinity of its surface that contacts a carburized layer of a rolling raceway surface of a roller bearing. The amount of retained austenite of the surface layer of the roller bearing is increased by about 30%. The surface layer is then heat treated to apply a residual compression stress. The surface then receives surface finishing to produce micro concavo-convex portions in a random direction.

5 Claims, 3 Drawing Sheets

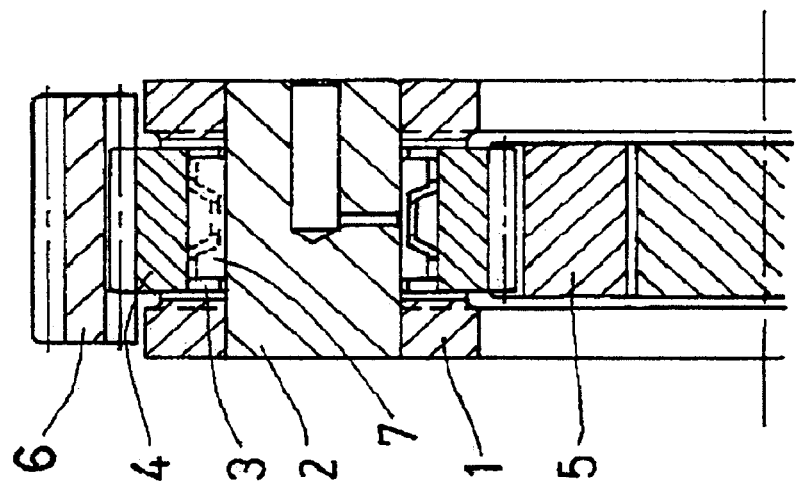
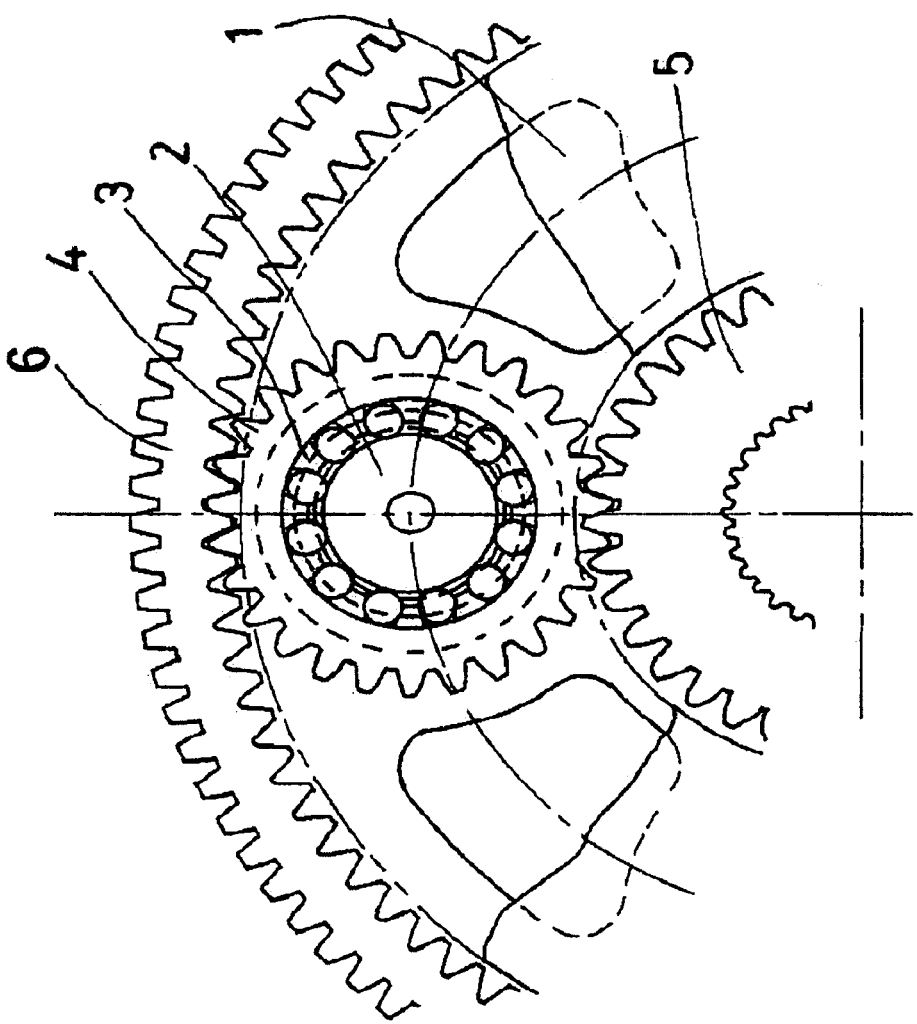

METHOD FOR FORMING A BEARING RACE FOR A CYLINDRICAL BEARING

BACKGROUND OF THE INVENTION

1. Field of the Invention

The present invention relates to a bearing part for a cylindrical roller bearing and a needle roller bearing. By applying the bearing part to a rolling raceway surface of a roller of the cylindrical roller bearing or needle roller bearing, it is possible to extend the life of the rolling raceway surface of a roller of the bearing part of the cylindrical roller bearing or needle roller bearing.

Moreover, the bearing part is formed with a surface layer having a retained austenite of about 30%. The surface layer is subjected to a specific heat treatment for applying a residual compression stress. Thereafter, surface layer is subjected to specific surface machining so that the surface is formed with micro concavo-convex portions in a random direction. Then, a cylindrical roller bearing or needle roller bearing having a long life roller are used in combination with these bearings. This procedure makes it possible to achieve a long life of the entire bearing structure comprising the bearing part and the cylindrical roller bearing or needle roller bearing.

2. Description of the Related Art

In order to achieve a long life of the entire bearing structure comprising a cylindrical roller bearing or needle roller bearing and a bearing part having a rolling raceway surface of a roller of the bearing, both the roller of the bearing and the raceway surface must have a long life. Otherwise it is impossible to achieve a long life of the entire bearing structure.

In order to extend the life of the cylindrical roller bearing or needle roller bearing, for example, Unexamined Patent Publication (Kokai) No. 5-239550 has disclosed a roller for a cylindrical roller bearing or needle roller bearing, having a longer life than in the conventional case. This is achieved by improving a retained austenite amount of a surface layer by about 30%, and subjecting the surface layer to a specific heat treatment for applying a residual compression stress. Thereafter, the part is subjected to specific surface machining so that the surface is formed with micro concavo-convex portions in random directions.

However, in the bearing part used as a rolling raceway surface of the roller of the cylindrical roller bearing or needle roller bearing, conventionally, a case hardened steel is subjected to a carburizing treatment. Thereafter, the surface is merely subjected to finishing so as to have an accuracy (i.e., deviation from circular form, cylindricity (deviation from cylindrical form), surface roughness) enough to function as a rolling raceway surface of the roller.

For this reason, even if the cylindrical roller bearing or needle roller bearing having the aforesaid long life roller is used, the bearing part used as a rolling raceway surface of the roller remains the same as in the conventional case. Thus, the life of the rolling raceway surface of the roller of the bearing part is deteriorated. This limits the life of the entire bearing structure. As a result, there is a problem that the aforesaid roller having a long life is not effectively used.

OBJECTS AND SUMMARY OF THE INVENTION

The present invention has been made in order to solve the aforesaid problem in the prior art. It is, therefore, an object of the present invention to provide a bearing part having a rolling raceway surface of a long lifer roller of a cylindrical roller bearing or needle roller bearing.

Further, by extending the life of the rolling raceway surface of the roller of the bearing part of cylindrical roller bearing or needle roller bearing, when the long-life raceway surface is used with a cylindrical roller bearing or needle roller bearing having the aforesaid long life roller, the combination achieves a longer life of the entire bearing structure. This permits effective use of the long life roller.

In order to achieve the above objects, the bearing part according to the present invention is subjected to a carbo-nitriding treatment to form a layer containing 30% to 80% retained austenite in the vicinity of a surface of a carburizing layer which is used as a rolling raceway surface of a cylindrical roller bearing or needle roller bearing.

Moreover, even in the case where the surface of the bearing part according to the present invention is subjected to finishing so as to deviate from circular form, a cylindricity (deviation from cylindrical form), and surface roughness) enough to function as a rolling raceway surface of the roller of the cylindrical roller bearing or needle roller bearing, a layer containing 30% to 80% retained austenite is secured in the vicinity of a surface of a carburizing layer used as a rolling raceway surface of a cylindrical roller bearing or needle roller bearing.

In the above bearing part according to the present invention, the layer containing 30% to 80% retained austenite is formed in the vicinity of a surface of a carburizing layer used as a rolling raceway surface of a cylindrical roller bearing or needle roller bearing. The layer is softer as compared with a carburizing hardened layer; therefore, the bearing part has the following effects:

1) the initial performance is excellent, with the additional benefit of relieving a locally high surface pressure in the initial bearing operation, and
2) in particular, in the initial bearing operation, even if many of micro foreign matter generated by running-in wear of each part are mixed therein, these micro foreign matters are embedded in the surface; therefore, they have almost no influence on the rolling of the roller of the bearing.

Moreover, in the bearing part according to the present invention, a residual compression stress is applied to the uppermost surface layer containing much (30 to 80%) retained austenite; therefore, generation of cracks on the surface of the bearing part and spread of the generated cracks is prevented.

Further, according to the present invention, the uppermost surface layer containing 30 to 80% retained austenite is hardened by surface pressure applied by a roller during bearing operation. As a result, the surface layer of the bearing part is extremely hard and tough.

Finally, the increased hardness of the surface layer of the bearing part increases the working life of the raceway.

By the aforesaid effects, the bearing part of the present invention has a life that is several times as long as with the conventional bearing part in the case of using the bearing part as a roller rolling raceway of the cylindrical roller bearing or needle roller bearing.

Moreover, in the bearing part of the present invention, the amount of retained austenite contained in the surface layer of the bearing part is increased by 30%. The surface is subjected to a specific heat treatment for applying a residual compression stress. Thereafter the surface is subjected to specific surface machining to form micro concavo-convex portions in a random direction. In this manner, a long roller life is achieved. Thus, in the case of making a combination of a cylindrical roller bearing or needle roller bearing having the aforesaid long life roller, the bearing part is used as a roller of the cylindrical roller bearing or needle roller bearing and as a rolling raceway surface of the roller of the cylindrical roller bearing or needle roller bearing, and the uppermost surface of the bearing part has a layer containing much retained austenite. Therefore, the above effects to can be further enhanced.

Whereby it is possible to achieve a long life of the entire bearing structure comprising the cylindrical roller bearing or needle roller bearing and the bearing part having the rolling raceway surface of the roller, and thus, to effectively use a long life effect of the roller.

BRIEF DESCRIPTION OF THE DRAWINGS

FIGS. 1(a) and 1(b) are explanatory views showing an embodiment of the invention in which a bearing part according to the present invention and a needle roller bearing having a long life roller are applied to a planet gear supporting mechanism of a planetary gear transmission.

DETAILED DESCRIPTION OF THE PREFERRED EMBODIMENTS

Figure 2:
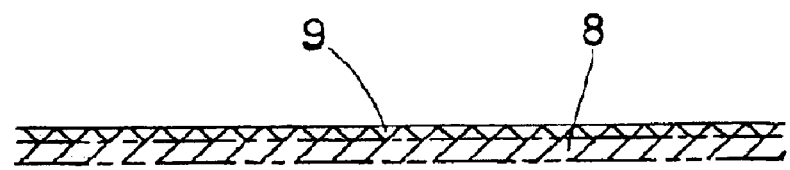
FIG. 2 is a schematic view showing the condition of a surface of the bearing part according to the present invention.

FIGS. 1(a) and 1(b) show an example using a bearing structure comprising a needle roller bearing and a bearing part having a raceway surface, on which a roller of the needle roller bearing rolls, as a planet gear supporting mechanism of a planetary gear transmission (drive). A shaft 2 fixed to a planetary carrier 1 rotatably supports a planet gear 4 around an axis of the shaft 2 via a needle roller bearing 3. The planet gear 4 engages a sun gear 5 and a ring gear 6.

A roller 7 of the needle roller bearing 3 has a surface layer which contains retained austenite in amount of about 30%, and is subjected to a specific heat treatment for applying a residual compression stress, and thereafter, is subjected to surface machining to form micro concavo-convex portions in a random direction. In this manner, it is possible to obtain a needle roller bearing having a long life roller.

The bearing part of the present invention is used as the shaft 2. FIG. 2 is a schematic view showing a state of the surface of the shaft 2 according to the present invention. The shaft 2 is formed in the following manner. More specifically, nickel chrome molybdenum steel is machined to a predetermined shape. Then, the part is subjected to a carburizing treatment at a temperature of 930° C. so that its surface develops a carburizing layer 8. Subsequent to the carburizing treatment, the carburizing layer 8 is subjected to a carbonitriding treatment at a temperature of 750° C. to 850° C. so that its surface develops a layer 9 containing much retained austenite. Thereafter, an outer-diameter surface is finished so as to have a deviation from circular form of 0.002 mm or less, a cylindricity of 0.002 mm or less and a surface roughness, that is, the maximum height of 0.001 mm or less. In the uppermost surface of the shaft 2, the layer 9 contains 30 to 80% retained austenite after finishing.

Figure 3:
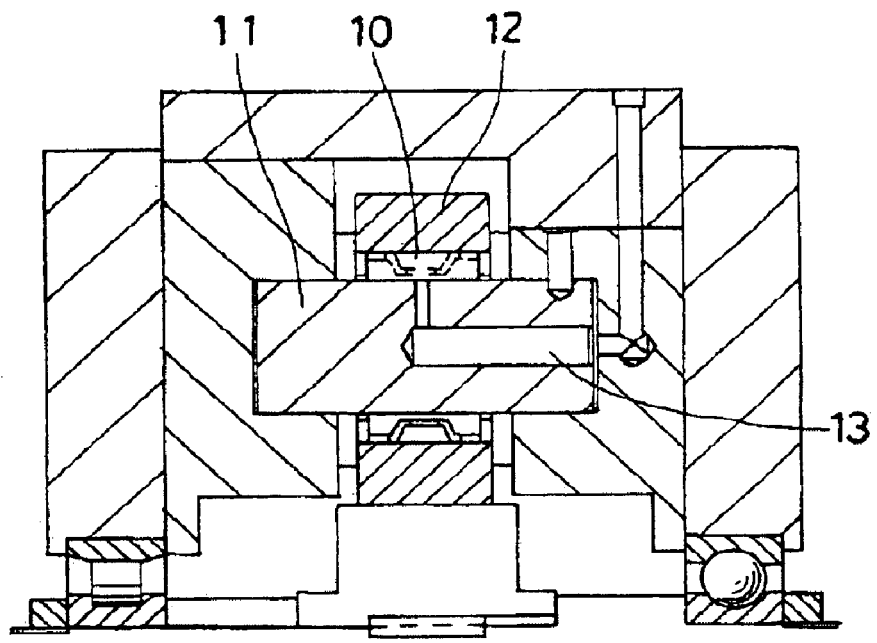
FIG. 3 is a schematic view showing a test machine used for a life comparative test.

Next, in order to confirm a long life effect of the present invention, a life comparative test will be described below. FIG. 3 is a schematic view showing a test machine used in the life comparative test. First, a test bearing 10 was fitted into a test bearing part 11, and then, was incorporated into an outer ring 12. The outer ring 12 was rotated around the central axis while a test force was applied thereto. The test bearing 10 and the test bearing part 11 was lubricated by oil supplied via a lubricating oil supply hole 13 provided in the test bearing part 11. The combination of the life comparative test is two kinds, that is, A and B shown in Table 1.

TABLE 1

| Combination | Roller of test needle roller bearing | Test bearing part | Number of test pieces |
|---|---|---|---|
| A<br>Present invention | Long life roller<br>(which is subjected to specific heat treatment and micro concavo-convex surface finishing) | Bearing part of the present invention<br>(which is subjected to finishing after carbonitriding treatment) | Three |
| B<br>Conventional case | Conventional roller<br>(which is subjected to specific heat treatment) | Conventional bearing part<br>(which is subjected to finishing after carbonitriding treatment) | Three |

Moreover, the test conditions are shown in the following Table 2, and the test results are shown in the following Table 3, respectively.

TABLE 2

| Test method | Rotating outer ring load test |
|---|---|
| Test force (radial load) | 22.5 kN {2300 kgf} |
| Rotational speed of outer ring | 1500 rpm |
| Kind of lubricating oil | Oil equivalent to turbine oil two kinds ISO VG 32 |
| Kind of lubricating oil | 200 ml/min |
| Kind of lubricating oil | 50° C. |
| Specification of test needle roller bearing | Inner diameter: 28 mm Outer diameter: 38 mm Width: 16.8 mm Roller diameter: 5 mm Number of rollers: 14 with cage<br>Long life roller (which is subjected to specific heat treatment and micro concavo-convex surface finishing) / Conventional roller (which is subjected to specific heat treatment) |
| Basic dynamic load rating of test needle roller bearing | 28.0 kN {2860 kgf} |
| Specification of test bearing part | Outer diameter: 28 mm<br>Outer diameter deviation from circular form: 0.002 mm or less<br>Outer diameter cylindricity: 0.002 mm or less<br>Outer diameter surface roughness<br>Maximum height: 0.001 mm or less<br>(A) Bearing part of the present invention (which is subjected to finishing after carbonitriding treatment) / (B) Conventional bearing part (which is subjected to finishing after carbonitriding treatment) |
| Calculated life (accumulated fracture probability: 10%) | 23 hours |

TABLE 3

| Combination | L10 life (Note 1) | L10 life ratio (Note 2) |
|---|---|---|
| (A) Present invention | 63.1 hours | 3.11 |
| (B) Conventional bearing | 20.3 hours | 1.00 |

(Note 1) The above L10 life is a life time in the case where an accumulated fracture probability calculated from the test results of three pieces of each of the combinations (A) and (B).
(Note 2) The above L10 life ratio is a ratio of the combination (A) of the present invention when the L10 life of the combination (B) of the conventional bearing is set to 1.00.

Figure 4:
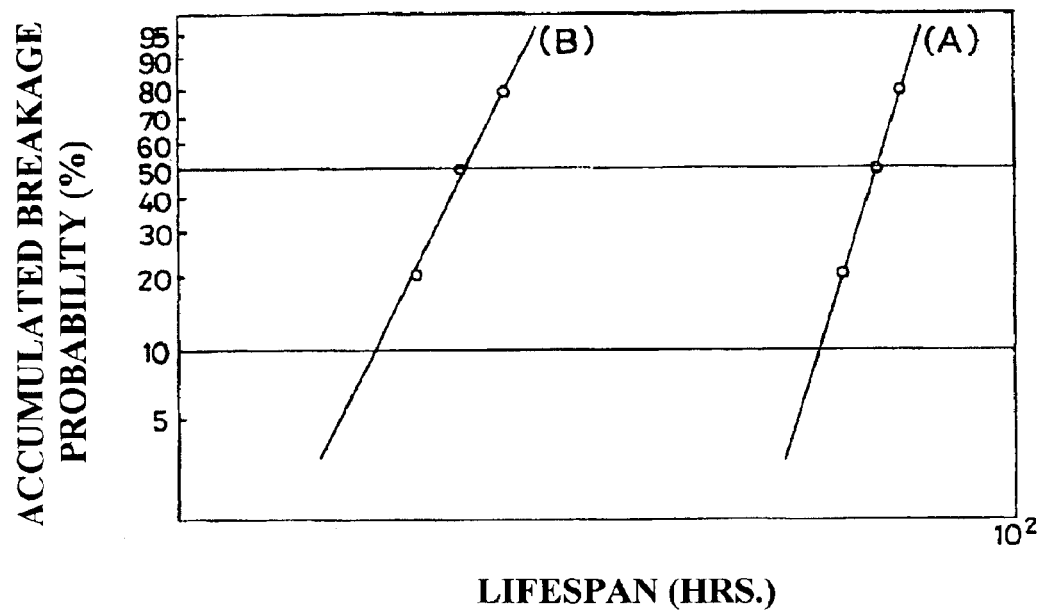
FIG. 4 is a Wiebull diagram showing a test result of an accumulated fracture probability and a life between a combination A of the bearing part of the present invention and a needle roller bearing having a long life roller.

FIG. 4 is a Wiebull diagram showing a test result of an accumulated fracture probability and a life between a combination A of the bearing part of the present invention and a needle roller bearing having a long life roller. As is evident from the above life comparative test result, the combination A, that is, the needle roller bearing having the bearing part of the present invention and the long life roller has a life of three times or more as long as the conventional combination B. Therefore, according to the present invention, the life of the bearing part is increased, and thereby, it is possible to effectively use a long life effect of the roller of the bearing, and thus, to increase the life of the entire bearing structure comprising the bearing part and bearing.

Finally, the following is a description on the test result in the case where the combination of the needle roller bearing having the bearing part of the present invention and the long life roller is applied to an actual planetary transmission gear for construction machinery. The applied portion is a planet gear supporting mechanism of a planetary gear transmission having the same structure as shown in FIG. 1. The test results are shown in the following table

TABLE 4

| Test machine | Planetary transmission gear for construction machinery<br>Planet gear supporting mechanism of planetary gear transmission |
|---|---|
| Test force (radial load) | 27.6 kN {2821 kgf} |
| Rotational speed of outer ring | 1218 rpm |
| Kind of lubricating oil | Oil equivalent to engine oil SAE 30 |
| Specification of test needle roller bearing | Inner diameter: 38.1 mm<br>Outer diameter: 54.1 mm<br>width: 34.8 mm Roller diameter: 8 mm<br>Number of rollers: 12 with cage<br>Long life roller (which is subjected to specific heat treatment and micro concavo-convex surface finishing) |
| Basic dynamic load rating of test needle roller bearing | 66.6 kN {6800 kgf} |
| Specification of test bearing part | Outer diameter: 38.1 mm<br>Outer diameter deviation from circular form: 0.002 mm or less<br>Outer diameter cylindricity: 0.002 mm or less<br>Outer diameter surface roughness Maximum height: 0.001 mm or less<br>Bearing part of the present invention (which is subjected to finishing after carbonitriding treatment) |
| Calculated life (accumulated fracture probability: 50%) | 482 hours |
| Test time | 1487 hours |
| Fracture state after test | Roller of test needle roller bearing: no fracture test bearing part: no fracture |
| Test time/calculated life | 3.09 |

The needle roller bearing having the bearing part of the present invention and the long life roller experienced no fracture in a test time of three times or more as its calculated life time. Therefore, according to the present invention, it is possible to make long a life of the entire bearing structure comprising the bearing part and bearing more than three times.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for producing a cylindrical or needle bearing structure including a rolling raceway having a surface and receiving at least one roller, comprising the steps of:

forming the rolling raceway surface, comprising the steps of;
   carburizing the rolling raceway surface to form a surface carburizing layer; and
   carbonitriding the rolling raceway surface to form a layer containing 30% to 80% retained austenite contacting the surface carburizing layer providing the cylindrical bearing or the needle bearing;

carbonitriding a surface of the roller to produce an amount of retained austenite in a surface layer that is increased by about 30% from an austenite concentration of the roller surface prior to the step of carbonitriding;

subjecting the roller to a surface finishing which produces micro concave-convex portions in a random direction; and forming the bearing structure wherein an L10 life ratio of the bearing structure, when tested using standard lubricant, is greater than or equal to three times an L10 ratio of a conventional bearing structure.

2. A method for forming a rolling raceway surface for a cylindrical bearing comprising:

carburizing a surface of said rolling raceway surface to produce a carburized layer; and carbonitriding a surface layer of said carburized layer;

wherein the step of carbonitriding includes forming a surface layer containing from 30% to 80% retained austenite in said rolling raceway surface; and wherein the L10 life ratio of said rolling raceway, when tested using standard lubricant, is greater than or equal to three times an L10 life ratio of the conventional rolling raceway.

3. The method according to claim 2, further comprising:

surface finishing a surface of said surface layer after the step of carbonitriding; and the step of surface finishing being effective to produce a surface having a cylindricity and a surface roughness suitable for use as a rolling raceway surface.

4. The method according to claim 3, wherein the step of finishing includes producing micro concave-convex portions in random directions said surface.

5. The method according to claim 2, further comprising heat treating said rolling raceway surface to produce residual compression stress.

* * * * *

UNITED STATES PATENT AND TRADEMARK OFFICE
CERTIFICATE OF CORRECTION

PATENT NO. : 6,948,247 B2
DATED : September 27, 2005
INVENTOR(S) : Osamu Kodama et al.

It is certified that error appears in the above-identified patent and that said Letters Patent is hereby corrected as shown below:

Title page,
Item [54], Title, delete "METHOD FOR FORMING A BEARING RACE FOR CYLINDRICAL BEARING" and substitute -- BEARING PARTS FOR CYLINDRICAL ROLLER BEARING AND NEEDLE ROLLER BEARING --.

Signed and Sealed this

Tenth Day of January, 2006

JON W. DUDAS
*Director of the United States Patent and Trademark Office*